(12) United States Patent
Lewis

(10) Patent No.: US 7,815,695 B2
(45) Date of Patent: Oct. 19, 2010

(54) STARCH AS A FUEL OR FUEL COMPONENT

(75) Inventor: Leonard T. Lewis, Fulton, IL (US)

(73) Assignee: LenLo Chem, Inc., Fulton, IL (US)

( * ) Notice: Subject to any disclaimer, the term of this patent is extended or adjusted under 35 U.S.C. 154(b) by 514 days.

(21) Appl. No.: 11/865,990

(22) Filed: Oct. 2, 2007

(65) Prior Publication Data

US 2008/0016843 A1 Jan. 24, 2008

Related U.S. Application Data

(63) Continuation of application No. 11/343,985, filed on Jan. 31, 2006, now Pat. No. 7,282,071.

(51) Int. Cl.
*C10L 1/10* (2006.01)

(52) U.S. Cl. ....................................... 44/313

(58) Field of Classification Search .................... 44/313
See application file for complete search history.

(56) References Cited

U.S. PATENT DOCUMENTS

| | | | |
|---|---|---|---|
| 2,852,404 A | 9/1958 | Satterthwaite | |
| 2,961,339 A | 11/1960 | Wolff | |
| 3,071,492 A | 1/1963 | Satterly | |
| 3,462,283 A | 8/1969 | Hjemstad et al. | |
| 3,788,945 A | 1/1974 | Thompson et al. | |
| 4,016,117 A | 4/1977 | Griffin | |
| 4,173,488 A | 11/1979 | Vassiliades et al. | |
| 4,293,312 A | 10/1981 | Fox | |
| 4,981,494 A | 1/1991 | Breuil et al. | |
| 5,213,920 A | 5/1993 | Coppens et al. | |
| 5,298,040 A | 3/1994 | Gosset et al. | |
| 5,454,843 A | 10/1995 | Rollin et al. | |
| 5,672,699 A | 9/1997 | Billmers et al. | |
| 6,037,466 A | 3/2000 | Maliczyszyn et al. | |
| 7,282,071 B2 * | 10/2007 | Lewis ........................... | 44/313 |
| 2002/0015854 A1 | 2/2002 | Billmers et al. | |
| 2003/0145515 A1 | 8/2003 | Pourtout | |

FOREIGN PATENT DOCUMENTS

| | | |
|---|---|---|
| CA | 726667 A | 1/1966 |
| GB | 1444335 | 3/1975 |
| JP | 55129493 | 10/1980 |
| JP | 55129493 A | 10/1980 |
| JP | 56074513 A | 6/1981 |
| JP | 56139590 A | 10/1981 |
| JP | 57137389 | 8/1982 |
| JP | 57137389 A | 8/1982 |
| WO | WO2006/091580 | 8/2006 |

OTHER PUBLICATIONS

International Search Report for PCT/US06/06080, Jul. 10, 2006 (Lewis).

* cited by examiner

*Primary Examiner*—Cephia D Toomer
(74) *Attorney, Agent, or Firm*—McAndrews, Held & Malloy, Ltd.

(57) ABSTRACT

New fuels and fuel components comprising starch are provided, as well as novel methods for operating a combustor such as a boiler or an internal combustion engine by feeding a starch fuel to the combustor.

16 Claims, No Drawings

STARCH AS A FUEL OR FUEL COMPONENT

CROSS-REFERENCE TO RELATED APPLICATIONS

This application is a continuation of U.S. application Ser. No. 11/343,985, filed on Jan. 31, 2006 now U.S. Pat. No. 7,282,071, which is incorporated herein by reference.

New fuels and fuel components comprising starch are provided, as well as novel methods for operating a combustor such as a boiler or an internal combustion engine by feeding a starch fuel to the combustor.

BACKGROUND OF THE INVENTION

The public's interest in renewable energy sources such as biofuels is higher than ever. A lot of this interest in biofuels can be attributed to the desire to lessen America's dependence on imported crude oil. The price of crude oil has fluctuated at a high level recently, and there are frequent tensions with many oil-producing countries. During 2005, U.S. crude oil reached highs of nearly $71 a barrel in August, up from $43 at the beginning of the year. It appears unlikely that prices will stabilize in 2006, given the continued unrest in Iraq and simmering tensions with Iran. Iran is the second largest crude oil producer in OPEC and holds 10% of the world's proven oil reserves. Iran recently warned that crude oil prices would soar if Iran were subjected to economic sanctions in response to its nuclear program. Gasoline has become relatively expensive for American drivers, recently reaching prices of over three dollars per gallon. American motorists have been frustrated by these relatively high gasoline prices, especially over the summers of 2004 and 2005.

Interest in biofuels can also be attributed to public awareness regarding pollution and environmental hazards from the consumption of fossil fuels. The burning of fossil fuels such as petroleum-based fuels, coal and natural gas causes a release of pollutants that may increase global climate change, acid rain, and ozone problems. Fossil fuels are not considered renewable energy sources, as they are the result of organic material being covered by successive layers of sediment over the course of millions of years.

Most cars and trucks on the road today are fueled by gasoline and diesel fuels. These fuels are produced from crude oil, which is a non-renewable fossil fuel. Non-renewable fuels depend on resources that will eventually run out. Renewable energy sources, in contrast, are constantly replenished and will not run out. One type of renewable resource is biomass, which includes plants and organic wastes that can be converted to fuels, chemicals, and other materials. Biomass can be used as solid fuels, or can be converted into liquid or gaseous forms, for the production of electric power, heat, chemicals, or fuels.

Government agencies and corporations in the energy and transportation industries continue to search for and develop renewable energy sources. The U.S. Department of Energy Biomass Program develops technology for conversion of biomass (plant-derived material) to fuels, chemicals, materials and power, so as to reduce dependence on foreign crude oil and foster growth of biorefineries. Biomass can provide a renewable alternative for liquid transportation fuel. The use of biomass would aid rural economies, decrease America's dependence on imported crude oil and reduce pollution.

Ethanol is currently used as a biofuel, most commonly as a fuel component with gasoline for automotive use. In fact, a significant proportion of gas purchased at the pump contains about 10 or 15% ethanol. Ethanol has been widely used as a fuel component in gasoline for about 30 years. Its use as a fuel component was initially motivated by problems with petroleum supplies in the 1970's, as well as political pressure to reduce American dependence on imported crude oil. The use of ethanol was also motivated by a desire to increase the demand for agricultural products such as corn. Ethanol can be obtained by fermentation of hydrolyzed starch, which is obtained by the processing of corn and other agricultural crops.

One of the challenges in getting biofuels to replace fossil fuels has been that the cost of creating biofuels has been higher than the cost of traditional petroleum exploration, production and refining. Another challenge has been that significant energy is required to create a BTU of biofuel, perhaps more than biofuel itself produces in some cases. However, such challenges may be met or reduced (at least in part) by increased crop yield due to biotechnology, improved biomass refinery methods, and increased petroleum costs.

Despite those challenges, use of biofuels in the United States had steadily increased, and the U.S. Department of Energy has set goals to promote the further development and use of biofuels. Among those goals are that by the year 2020, ten percent of transportation fuel will be supplied by biomass, and five percent of industrial and utility power demands will be supplied by biopower.

Ethanol is not the only biofuel that is used commercially. Another is biodiesel, which is currently used in diesel engines. Biodiesel is made by transforming animal fat or vegetable oil with alcohol and can be directly substituted for diesel, either as neat fuel (B100) or as an oxygenate additive (typically 20%-B20). B20 earns credits for alternative fuel use and does not require the purchase of a new vehicle. In Europe, biodiesel is usually made from rapeseed (canola) oil, while in the United States, biodiesel is usually made from soybean oil.

Despite advances in the development of ethanol and biodiesel as biofuels, there remains a need for continued development of biofuels and fuel components from biomass which can be produced relatively easily and inexpensively. It would be highly desirable to identify new fuels and fuel components developed from biomass, including fuels and fuel components having a cost advantage with respect to existing biofuels.

BRIEF SUMMARY OF THE INVENTION

As one aspect of the present invention, novel fuels and fuel components are provided that include starch, a biomass that can be obtained from corn, potatoes, and other agricultural products. Starch fuels or fuel components can be used for fueling internal combustion engines or other combustors. As such, starch fuels and fuel components provide a feasible and sensible alternative or addition to petroleum-based fuels and to currently available biofuels. Moreover, the present fuels and fuel components can be obtained from the relatively inexpensive processing of starch and formation of starch slurry and/or starch powder produced during the existing processing operations for milling corn or other crops.

As another aspect of the present invention, methods are provided for operating or fueling various types of combustors by feeding starch to the combustor, preferably as a powder or a slurry. The methods can be used with a variety of combustors, such as steam generating boilers, various types of kilns, rotary driers, blast furnaces and other types of combustors. As another example, the combustor can be an internal combustion engine such as a diesel engine or an engine that has a spark plug. The methods can include feeding or introducing a fuel comprising starch as a slurry or powder into the combustion area of the combustor. The fuel can be fed gravimetrically by conveyor belts, screw conveyors, pneumatic injection systems (such as for starch powders), or hydraulic injection systems (such as for starch slurries_. The methods can also include feeding an oxidant such as air to the combustor for combustion, and combusting the starch to provide heat or perform work. The methods can also include creating or maintaining combustion conditions in the combustor or a combustion area.

An object of the present invention is the use of starch, such as modified starch or common (unmodified) starch, as a solid fuel or a fuel slurry for various types of combustors including internal combustion engines. Another object is to provide a fuel or fuel component in which the energy and/or cost used to produce the fuel is minimized. For example, it is desirable to produce a biofuel such as a starch fuel having equal or more energy content for less cost and energy used to produce another biofuel such as ethanol. Another object is to provide a fuel or fuel component which would be price-competitive with petroleum-based fuels. Another object is to provide a fuel or fuel component which does not depend on tax subsidies that presently support the use of ethanol as a fuel. Still another object of the present invention is to provide a fuel or fuel component comprising starch in which the energy for producing the fuel is minimized.

DETAILED DESCRIPTION OF THE INVENTION

In the present methods, starch can be used as a fuel or a fuel component for a combustor such as a boiler, kiln, dryer or furnace. Other examples of combustors are internal combustion engines such as vehicle engines or generators, including gasoline engines, diesel engines, jet engines, and others. The starch may be a modified starch or a common (unmodified) starch and may be in granule form or in particulate form.

A fuel for a combustor may consist essentially of a starch. Alternatively, a starch can be the primary combustible component in a fuel. Alternatively, a fuel may comprise a starch as one fuel component along with other fuel components such as gasoline, diesel, kerosene, or jet fuels. In such fuels, the starch is one combustible, and one or more other combustibles. Other possible fuel components are alcohols. The present fuels and fuel components may also include detergents, and deposit control agents, as well as various other fuel additives known in the automotive field.

When used in a boiler or other combustor, a fuel is fed to a furnace or combustion area, where the fuel is ignited by a flame or other ignition source. The fuel may be a solid biofuel consisting essentially of starch in granule or particulate form, or other fuel components or other materials can be included in the fuel. Preferably the solid fuel has a relatively low moisture content so that energy is not used to evaporate moisture from the fuel. The fuel can be mixed with an oxidant such as air in the combustion area or before being fed to the combustion area. The fuel is then combusted, such as by igniting the fuel with a flame and creating or maintaining combustion conditions. Heat from the combusted starch is used, such as to turn water into steam or to provide heat for drying another material. A device for atomizing a starch powder or converting a starch slurry to an aerated suspension can be provided in connection with boilers and other types of combustors.

When used in a gasoline internal combustion engine, a fuel comprising a starch powder or slurry is mixed with air in a carburetor and passed to the cylinder, or is introduced by an injector into the cylinder, where a spark plug is timed to generate a spark to ignite a fuel/air mixture. A piston in the cylinder moves axially in a stroke, providing rotational motion to a crank shaft via a connecting rod.

When used in a diesel engine, a fuel comprising a starch powder or slurry is injected into compressed air in an engine cylinder, and the heat of the compressed air ignites the fuel (although a glow plug or other ignition device may be used under some circumstances, such as when the engine is cold). Diesel engines use direct fuel injection—the diesel fuel is injected directly into an engine cylinder by an injection system. Injection systems are known in the art for providing fuel powders to engines.

When used in a jet engine, a fuel comprising a starch powder or slurry is combined with air drawn in at the front which has been compressed. The fuel combined with air is typically ignited by a flame in the eddy of a flame holder, and burned as an atomized mixture. The combustion greatly increases the energy of the gases which are then exhausted out of the rear of the engine. The jet engine generates thrust because of the acceleration of the air through it—the equal and opposite force this acceleration produces is thrust.

Combustors include various types of engines, heaters and other equipment and machinery that employ the combustion of a fuel to provide heat or perform work. For example, internal combustion engines for vehicular applications combust fuel to perform work by moving pistons, turbines or other apparatus to provide motion to a vehicle. Internal combustion engines include gasoline engines, diesel engines, jet engines and others. Other examples of combustors are boilers, rotary kilns, dryers, and blast furnaces which produce heat.

Combustors fueled by starch can be used in a wide variety of vehicles and equipment. For example, internal combustion engines fueled by the present fuels and fuel components can power automobiles, trucks, lawn mowers, tractors, farm machinery, trains, marine engines, fire pumps, power generators, jet engines, industrial equipment such as chippers and air compressors, locomotives, mining machinery, and others. This is not an exhaustive list, and it is contemplated that fuels comprising a starch are suitable for any use or application of an internal combustion engine or other combustor.

Starch fuels in slurry or solid form can be used in internal combustion engines or other combustors, or an engine or its associated equipment (for example, ignition devices or fuel injectors) which may be modified using routine engineering principles to be more suitable for operation using a starch powder or slurry as a fuel. For example, an agitator or mixer can be located upstream of the internal combustion engine or other combustor so as to maintain the fuel slurry in a homogenous state and to prevent starch particulates from settling and separating from the liquid component of the slurry. The use of powdered or particulate fuels for internal combustion engines has been described in the public literature such as, for example, U.S. Pat. No. 3,981,277 (Abom), U.S. Pat. No. 4,052,963 (Stieger), U.S. Pat. No. 4,070,997 (Stieger), U.S. Pat. No. 4,359,970 (Wolters), and U.S. Pat. No. 5,056,469 (Kimberley). Furthermore, powdered or particulate fuels of appropriate size can be used in existing common-rail injection systems, which are currently used with diesel engines and may also be used with gasoline engines.

The present fuels may be in the form of a powder, such as a solid fuel powder that comprises or consists essentially of a common starch or a modified starch. Alternatively, the present fuels may be in the form of a fuel slurry, which has solid particles within a liquid phase. In these fuels, the starch may be included in the fuel in granule form or in particulate form. Where a fuel is in solid or slurry form, it is desirable that the fuel has particles having an appropriately small particle size. A finely divided particulate form is preferred when the starch is to be used in an internal combustion engine such as a common rail injection system. In general, it is desirable to provide a fuel powder in very finely divided form, such as of a size to pass through a 325 mesh screen, a 200 mesh screen or a 150 mesh screen. Alternatively, the fuel powder can have a mean particle size less than about 100 micrometers, alternatively less than about 90 micrometers, alternatively less than about 75 micrometers, alternatively less than about 60 micrometers.

A fuel powder or slurry can be aspirated into a combustion cylinder of an internal combustion engine on a suction stroke. At the end of the compression stroke, the fuel powder or slurry can be ignited, such as by the heat of a compression or by a spark generating element, and thereby the fuel is caused to burn and produce a power stroke of the engine's piston. In a diesel engine, the fuel is generally ignited by the heat of the compressed air, though a glow plug is used when the engine is cold.

Alternatively, the present fuels or fuel components can be provided in slurry, solid, or gel form. Such fuels may be provided in fluid form, such as by suspending a starch in a liquid component. For example, starch may be combined with a liquid component to form a fuel slurry. Alternatively, starch may be combined with a liquid component to form a gel, such as a gelled gasoline or kerosene. For example, a starch may be included as a fuel component in a gelled fuel for a jet engine and could provide a significant proportion of the heat of combustion of the fuel.

Fuels and fuel components comprising starch may have various advantages over other fuels in terms of cost and convenience in handling and manufacture. Additionally solid fuels can be easier to handle than liquid fuels. A fuel provided as a free-flowing powder or in a particulate slurry may be used in place of or in combination with a liquid fuel in an internal combustion engine such as a diesel engine.

It is contemplated that it may be desirable to provide maximum or minimum concentrations of starch in a fuel. For example, the present fuels can have a starch content of more than about 0.5 weight percent (wt %). Alternatively, the present fuels may comprise at least about 1 wt % starch, at least about 2 wt % starch, at least about 5 wt % starch, alternatively at least about 6 wt % starch, alternatively at least about 7 wt % starch, alternatively at least about 8 wt % starch, alternatively at least about 9 wt % starch, alternatively at least about 10 wt % starch, alternatively at least about 11 wt % starch, alternatively at least about 12 wt % starch, alternatively at least about 13 wt % starch, alternatively at least about 14 wt % starch, alternatively at least about 15 wt % starch, alternatively at least about 16 wt % starch, alternatively at least about 17 wt % starch, alternatively at least about 18 wt % starch, alternatively at least about 19 wt % starch, alternatively at least about 20 wt % starch, alternatively at least about 22 wt % starch, alternatively at least about 25 wt % starch, alternatively more than 25 wt % starch, alternatively at least about 30 wt % starch, alternatively at least about 35 wt % starch, alternatively at least about 40 wt % starch, alternatively at least about 45 wt % starch, alternatively at least about 50 wt % starch, alternatively at least about 55 wt % starch, alternatively at least about 60 wt % starch, alternatively at least about 65 wt % starch, alternatively at least about 70 wt % starch, alternatively at least about 75 wt % starch, alternatively at least about 80 wt % starch, alternatively at least about 85 wt % starch, alternatively at least about 90 wt % starch, alternatively at least about 95 wt % starch.

It is also contemplated that it may be desirable to provide a maximum content of starch in the present fuels, such as at most about 5 wt % starch, alternatively at most about 10 wt % starch, alternatively at most about 15 wt % starch, alternatively at most about 16 wt % starch, alternatively at most about 17 wt % starch, alternatively at most about 18 wt % starch, alternatively at most about 19 wt % starch, alternatively at most about 20 wt % starch, alternatively at most about 25 wt % starch, alternatively at most about 30 wt % starch, alternatively at most about 35 wt % starch, alternatively at most about 40 wt % starch, alternatively at most about 45 wt % starch, alternatively at most about 50 wt % starch, alternatively at most about 55 wt % starch, alternatively at most about 60 wt % starch, alternatively at most about 65 wt % starch, alternatively at most about 70 wt % starch, alternatively at most about 75 wt % starch, alternatively at most about 80 wt % starch, alternatively at most about 85 wt % starch, alternatively at most about 90 wt % starch, alternatively at most about 95 wt % starch.

The weight percentages of starch are calculated on a dry basis by excluding the moisture content of the starch from the percentage. Any of the minimum and maximum concentrations of starch set forth above may be combined to define a concentration range of starch in a fuel.

For an automotive fuel, it is contemplated that desirable minimum and maximum concentrations of starch may be provided, such as for example, an automotive fuel having a concentration of from about 5 wt % to about 50 wt % starch, alternatively from about 10 wt % to about 45 wt %, alternatively, from about 25 wt % to about 35 wt %, alternatively from about 8 wt % to about 16 wt % starch.

An automotive fuel may be provided that comprises a starch and gasoline and/or another hydrocarbon. For example, a desirable automotive fuel may include starch and gasoline as the only combustibles or may include other combustibles. As another example, a fuel may be provided which consists essentially of starch and gasoline. An automotive fuel may also include methyl tertiary butyl ether (MTBE) and/or ethanol, as well as one or more other fuel additives such as detergents, anti-corrosion agents, and other additives used in automotive applications. Alternatively, an automotive fuel can include starch and gasoline and be substantially free of MTBE and/or ethanol.

A jet engine fuel may be provided that comprises starch and jet fuel. Such a jet fuel may be a solid fuel or a gel and may comprise, for example, less than about 20 wt % starch, alternatively less than about 15 wt % starch.

A fuel slurry may be provided that comprises, for example, more than 0.5 wt % starch, and/or less than about 55 wt % starch. A fuel slurry can be prepared by mixing free-flowing starch with a liquid component. Suitable liquid components include gasoline, diesel, kerosene, jet fuel, and alcohols. Preferably the free-flowing starch has a moisture content of about 8% or less, more preferably about 5.5% or less. The starch can be dried or re-dried to a desired moisture level and combined with a liquid component before absorbing a substantial amount of water from the air. The starch can be provided in granule or particulate form.

A fuel for an internal combustion engine or other combustor may consist essentially of a common or modified starch composition. In such a fuel, the starch composition is the main source of combustion. Alternatively, a fuel may comprise a starch composition as one fuel component along with other fuel components such as gasoline, diesel, kerosene, or jet fuels. In such a fuel, the starch is one combustible, and one or more other combustibles.

Starches suitable for use herein include corn starch, potato starch, tapioca starch, wheat starch, rice starch, sorghum starch, and the like, as well as combinations of any of the foregoing. The starch may be a modified starch or common (unmodified) starch. The starch may be in its original granule form, or it may be milled to reduce its particle size and/or homogenize its particle size and/or shape. The starch may have any suitable pH, though a starch having a near-neutral dry product pH will usually be preferred to avoid corrosiveness.

Starches are polymeric chains of glucose units. Natural starches from plants are mixes of two types of polymeric chains called amylose and amylopectin, in which the monomers are glucose units joined to one another head-to-tail forming alpha-1,4 linkages. Amylose is a linear polymer of glucose linked with $\alpha(1\rightarrow4)$ bonds. Amylopectin is a highly branched polymer of glucose found in plants. Its glucose units are linked in a linear way with $\alpha(1\rightarrow4)$ bonds, but branching takes place with $\alpha(1\rightarrow6)$ bonds occurring each 24 to 30 glucose units. The relative content of amylose and amylopectin varies between different species of starch.

Starch is generally produced by milling an agricultural product that is a source of starch (for example, corn, potatoes, tapioca, wheat, rice, sorghum, and the like). The product of milling is processed to remove fibers, proteins, and soluble material.

Modified and unmodified starches are products routinely produced in conventional corn wet milling plants, and as such, constitute a feasible and sensible alternative to petroleum-based fuels. The production of these type starches is not limited to corn wet milling operations but can include dry milling operations.

If the starch slurry produced by the corn wet milling process is simply dried, it is referred to as common, regular or unmodified starch which are intended to have the same meaning herein. It is available in various physical forms and pH ranges. Treating common starch with various chemicals such as acids and various oxidizing agents produces modified starches with various physical properties. Dry product pH of common and modified starches tend to vary between 4.0 to 8.0. In the present methods and compositions, the dry product pH of the starch used in the fuels and fuel components will generally be in the range of from about 4 to about 11, alternatively from about 4 to about 8, preferably from about 6.5 to about 7.5. The dry product pH of starch refers to the pH of an aqueous mixture when the starch is mixed in water at a concentration of 10 g of the starch in 50 ml of distilled water.

The moisture content of common and modified starches may vary between 4.5% to 13%. For the present invention, for a powdered starch fuel, it is preferred to dry or re-dry starch to obtain a starch having a moisture in the range of from about 4% to about 11%, alternatively from about 4.5% to about 8%, alternatively from about 4.5% to about 5.5%.

Starch can be less expensive than ethanol as a fuel, in terms of energy produced divided by cost of production. The preparation of ethanol from starch requires processing steps which add to costs. In the overall reaction of starch to produce ethanol $(C_6H_{10}O_5)\rightarrow 2_nC_2H_5OH+2_nCO_2$, there is a 3% decrease in enthalpy (heat content). Additionally, the large scale production of ethanol from starch still experiences some loss, generally attaining about 93% of the theoretical yield. More particularly, the overall enthalpy yield of starch converted to ethanol can be calculated as follows:

$$\frac{7120 \text{ cal per g} \times 2 \text{ moles (46 g) ethanol}}{4180 \text{ cal per g} \times 1 \text{ mole (162 g) starch}} = 96.73\% \text{ enthalpy yield.}$$

$96.73 \times 93\%$ large-scale production yield = 89.96% overall yield.

Thus the overall enthalpy yield is about 90%.

This loss of energy stored in starch and the amount of energy required for converting starch to ethanol in a large-scale production process make ethanol less attractive as a fuel alternative. In order to make ethanol more attractive in the U.S. fuel market, federal tax subsidies have been implemented. This reduces the direct price that is charged to the consumer for fuels containing ethanol, but tax revenue is reduced to promote the production and use of ethanol for transportation fuels. It would be desirable to provide a biofuel requiring fewer or no tax subsidies.

In addition to the use of common starch in the present fuels and fuel components, starches can be modified in several ways to change their characteristics. For example, starches can be modified by increasing cross-linking, or by heating to break long amylose and amylopectin chains down into smaller molecules like dextrin, polydextrin, and malto-dextrin. As another example, starches can have a hydrogen replaced by something else, such as a carboxymethyl group, carboxyethyl groups, or carboxypropyl groups. Such groups make the starch more hydrophilic, and aid in cross-linking. Oxidized starch, usually oxidized with sodium hypochlorite, is whiter than unmodified starch, has increased clarity, and a lower viscosity.

Another example of a modified starch is a hydrophobic starch. A hydrophobic starch can be prepared by combining a starch with an alkyl siliconate. It is contemplated that a free-flowing, hydrophobic starch having near-neutral dry product pH can be used as a fuel or a fuel component.

The hydrophobic starch has polymerized siliconate on the starch surface which tends to maintain low moisture content as well as mobility. Thus, a free-flowing, hydrophobic starch has less tendency to absorb moisture which would decrease mobility. A composition will be considered free-flowing when it has equal or better mobility than finely ground starch. An impalpable powder having a sufficiently low moisture content will generally be free-flowing.

Near-neutral pH is neither highly acidic nor highly alkaline. For example, near-neutral pHs include pHs between about 6 and about 8. The dry product pH of a composition refers to the pH of an aqueous mixture when the composition is mixed in water at a concentration of 10 g of the composition in 50 ml of distilled water. The present disclosure provides techniques for making hydrophobic starch compositions having dry product pHs greater than 6 or about 6, alternatively greater than 5 or about 5, alternatively greater than 4 or about 4, alternatively greater than 3 or about 3, alternatively greater than 2.6. The present disclosure provides techniques for making hydrophobic starch compositions having dry product pHs less than 8 or about 8, alternatively less than 9 or about 9, alternatively less than 10 or about 10, alternatively less than 11 or about 11, alternatively less than 12. Any of the minimum and maximum pHs set forth above may be combined to define a pH range.

Alkyl siliconates, in the form of the alkali metal salt, have been known as agents for imparting water resistance or water repellency to a wide variety of substrates such as masonry, water-based paint ingredients, powdered materials such as limestone, gypsum, and the like, paper, paperboard, and various textiles. Siliconates are sometimes referred to as silanolates or salts or siliconic acids.

Siliconates include organosiliconates such as alkyl siliconates and phenyl siliconates, and salts thereof. The preferred salts are sodium and potassium salts. Alkali metal alkyl siliconates include those defined by the general formula:

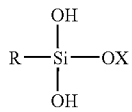

where R is an alkyl group containing 1 or more carbons and X is an alkali metal. The preferred alkali metal alkyl siliconate is sodium methylsiliconate, where R is a methyl group and X is sodium or potassium. Exemplary species of alkali metal organosiliconates include sodium methylsiliconate, sodium ethylsiliconate, sodium propylsiliconate, potassium methylsiliconate, potassium ethylsiliconate and potassium propylsiliconate.

Suitable acids include hydrogen-donating acids, for example, hydrochloric, sulfuric, nitric, phosphoric, and acetic acids. A preferred acid is hydrochloric acid.

The starches, siliconates and acids can be used in the following methods to make free-flowing, hydrophobic starch compositions. An aqueous mixture of starch, siliconate and acid is prepared in any suitable manner. For example, an aqueous slurry of corn starch can be prepared from dry substance granule corn starch, and a siliconate can be combined to form an aqueous mixture comprising the starch and the siliconate. The aqueous mixture can be adjusted to a desired near-neutral pH with the addition of a suitable amount of an acid. Alternatively, the aqueous mixture can be made by a method where a siliconate, preferably sodium methylsiliconate, is combined with an acid in an aqueous solution before combining the starch to form an aqueous mixture. In other words, an aqueous solution can be made from a siliconate and an acid, and the solution can be adjusted to a desired near-neutral pH with a suitable amount of acid.

Typical concentrations of starch in an aqueous slurry include the range of about 30% to about 39% by weight. Any appropriate starch may be used, though untreated corn starch is often preferred for reasons of economy or availability. The slurry can then be agitated by any suitable means. For example, variable or high speed propeller agitators or other types of mixing equipment can be used to agitate the slurry.

As mentioned above, the siliconate can be added to an aqueous slurry comprising starch to form an aqueous mixture of starch and siliconate, or the starch can be added to an aqueous solution comprising the siliconate. The siliconate can be combined with the starch slurry by itself or in combination with an acid. The amount of siliconate can be selected as a proportion of the amount of starch. For example, the concentration of the metal alkyl siliconate preferably will be approximately 0.05% to 5%, alternatively about 0.5% to 1.0%, alternatively about 0.8% by weight compared to the starch.

The pH of the aqueous mixture is adjusted to a desired pH by adding an acid. The pH can be adjusted to a near-neutral pH. The pH can be adjusted to a pH greater than 4 and less than about 10, alternatively between about 5 and about 9, alternatively between about 6 and about 8, alternatively between about 6.5 and about 7.5, alternatively between about 6.8 and about 6.9, using an acid which dissociates sufficiently in water to produce the desired pH.

The aqueous mixture having a near-neutral pH and comprising the starch and the siliconate is agitated for a suitable period, for example at least 30 minutes, although agitation can continue for longer or shorter periods. The starch can then be separated from the aqueous mixture by any effective means, such as by filtration, to obtain starch solids (the wet filter cake resulting from filtration).

The wet filter cake (the starch solids) is then dried to a suitable moisture content to obtain dried starch solids. For example, the filter cake may be dried to a minimum moisture content, such as a moisture content of at least about 6%, alternatively at least about 7%, alternatively at least about 8%, alternatively at least about 9%, alternatively at least about 10%. As another example, the filter cake may be dried to a maximum moisture content, such as at most about 11%, alternatively at most about 12%, alternatively at most about 13.5%. The foregoing minimum and maximum moisture contents may be combined to form ranges.

Drying promotes polymerization of the siliconate, which provides and/or contributes to free-flowing and hydrophobic attributes. Therefore, it is contemplated that the present methods may comprise polymerizing (rather than drying) at least some of the siliconate on at least some of the starch to form a hydrophobic starch. However, drying is the most convenient and practical technique for polymerizing at least some of the siliconate and for obtaining a starch composition having a desired moisture content. Drying temperatures in the range of 160 to 210 degrees Fahrenheit are preferred for drying, though other suitable temperatures, pressures and conditions can also be used and are easily determined.

The dried filter cake (dried starch solids) can then be powderized, such as by grinding or pulverizing, or by sieving the dried starch solids to remove oversize or non-powder material. The wet filter cake before powderizing does not have to be washed, nor does the powder have to be washed. The powder is hydrophobic and free-flowing, and has a near-neutral dry product pH. The method can also include the steps of adjusting the pH of the aqueous mixture with one or more acids, filtering off the starch without washing, drying the starch, then grinding and screening the resulting starch product through a sieve.

EXAMPLES

Fuels were made according to the present invention as follows. Commercial grade gasoline was obtained and mixed with starch to form fuel slurries having various starch contents. The starch used to prepare those fuels was a corn starch having approximately 11% moisture.

A first fuel slurry was prepared comprising about 34% by weight starch on a dry basis by mixing the starch with gasoline. The fuel slurry had excellent flowability characteristics. A second fuel slurry was prepared comprising about 44% by weight starch in gasoline, and this fuel slurry also had good flowability. A third fuel slurry was prepared comprising about 52% by weight starch in gasoline. This fuel slurry was more viscous than the first two slurries but exhibited acceptable flowability for use.

The foregoing starch contents were calculated on a dry basis. The moisture of the starch was factored into the calculation of the starch content of the fuel by multiplying the measured weight of the starch by 0.89 to determine the actual weight of the starch on a dry basis added to the gasoline. The weight of the gasoline was calculated based on the volume of gasoline used, based on a specific gravity for gasoline of 0.74 g/ml.

As another example of a fuel according to the present invention, a solid fuel comprising starch is prepared as follows. Corn starch is prepared by a wet milling process and dried to yield a starch having a moisture content of about 11%. This starch is re-dried to reduce the moisture content to about 5%, and the re-dried starch is milled or comminuted to yield a finely divided particulate material. For example, the particulate material can be of a size that passes through a 200 mesh screen or a 150 mesh screen. The particulate starch is suitable for use as a fuel powder for a boiler. A fuel consisting essentially of the starch powder at about 5% moisture is free-flowing and can be fed to a boiler or another combustor and combusted to provide heat to water or another fluid in the boiler.

All patents, test procedures, and other documents cited herein are fully incorporated by reference to the extent such disclosure is not inconsistent with this invention and for all jurisdictions in which such incorporation is permitted.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the dependent claims have single dependencies in accordance with U.S. patent practice, each of the features in any of the dependent claims can be combined with each of the features of other independent or dependent claims.

I claim:

1. A method of operating a combustor comprising:
   feeding a fuel comprising at least about 90 wt % starch to the combustor,
   feeding an oxidant to the combustor, and
   combusting the fuel.

2. The method of claim 1 where fuel comprises at least about 95 wt % starch.

3. The method of claim 1 wherein the starch is fed to the combustor as a powder.

4. A method of operating a combustor comprising:
   feeding a fuel comprising starch to the combustor, wherein the starch is a powder having particles capable of passing through 150 mesh or smaller screen,
   feeding an oxidant to the combustor, and
   combusting the fuel.

5. The method of claim 4 wherein the starch is a powder having particles capable of passing through a 200 mesh screen.

6. The method of claim 4 wherein the starch is a powder having particles capable of passing through a 325 mesh screen.

7. The method of claim 4 wherein the starch has a mean particle size less than about 100 micrometers.

8. The method of claim 4 wherein the starch has a mean particle size less than about 90 micrometers.

9. The method of claim 4 wherein the starch has a mean particle size less than about 75 micrometers.

10. The method of claim 4 wherein the starch has a mean particle size less than about 60 micrometers.

11. A method of operating an internal combustion engine, the method comprising:
    feeding a fuel powder comprising a starch and one or more automotive fuel additives to a combustion area of an internal combustion engine;
    feeding an oxidant to the combustion area; and
    combusting the starch in the combustion area of the internal combustion engine to perform work.

12. The method of claim 11 where the internal combustion engine is a diesel engine.

13. The method of claim 11 wherein the internal combustion engine powers an automobile, truck, lawn mower, tractor, farm machinery, train, marine engine, trucks, fire pump, power generator, jet engine, industrial equipment, chipper, air compressor, locomotive, or mining machinery.

14. The method of claim 11, wherein at least one of said fuel additives is an anti-corrosion agent.

15. The method of claim 11, wherein at least one of said fuel additives is methyl tertiary butyl ether.

16. The method of claim 1 wherein the starch has a mean particle size less than about 100 micrometers.

* * * * *